(12) United States Patent  
Wakimoto et al.

(10) Patent No.: US 11,289,734 B2  
(45) Date of Patent: Mar. 29, 2022

(54) METHOD FOR PRODUCING SECONDARY BATTERY

(71) Applicant: SANYO Electric Co., Ltd., Daito (JP)

(72) Inventors: Ryoichi Wakimoto, Hyogo (JP); Atsushi Tsuji, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 242 days.

(21) Appl. No.: 16/319,714

(22) PCT Filed: Jul. 26, 2017

(86) PCT No.: PCT/JP2017/026955  
§ 371 (c)(1),  
(2) Date: Jan. 22, 2019

(87) PCT Pub. No.: WO2018/021371  
PCT Pub. Date: Feb. 1, 2018

(65) Prior Publication Data  
US 2019/0267665 A1 Aug. 29, 2019

(30) Foreign Application Priority Data

Jul. 29, 2016 (JP) .............................. JP2016-149942

(51) Int. Cl.  
*H01M 10/0525* (2010.01)  
*H01M 10/04* (2006.01)  
(Continued)

(52) U.S. Cl.  
CPC ....... *H01M 10/0525* (2013.01); *H01M 10/04* (2013.01); *H01M 10/0431* (2013.01);  
(Continued)

(58) Field of Classification Search  
CPC .. H01M 10/0587; H01M 2/2017; H01M 2/30; H01M 10/04; H01M 2/26;  
(Continued)

(56) References Cited

U.S. PATENT DOCUMENTS

2009/0004561 A1 1/2009 Nansaka et al.  
2009/0239133 A1 9/2009 Kosugi  
(Continued)

FOREIGN PATENT DOCUMENTS

CN 103326056 A 9/2013  
CN 105702999 A 6/2016  
(Continued)

OTHER PUBLICATIONS

International Search Report dated Sep. 12, 2017, issued in counterpart International Application No. PCT/JP2017/026955 (2 pages).  
(Continued)

*Primary Examiner* — Jonathan G Jelsma  
*Assistant Examiner* — Omar M Kekia  
(74) *Attorney, Agent, or Firm* — Westerman, Hattori, Daniels & Adrian, LLP

(57) ABSTRACT

A method for producing a secondary battery including an electrode body having a positive electrode plate and a negative electrode plate, a prismatic outer body having an opening and houses the electrode body, a sealing plate that seals the opening of the prismatic outer body, and a positive electrode external terminal that is electrically connected to the positive electrode plate and attached to the sealing plate. The method includes a fixation step of electrically connecting a first positive electrode current collector to a positive electrode external terminal and fixing the first positive electrode current collector to the sealing plate, a first connection step of weld-connecting a stack of a plurality of positive electrode tabs to the second positive electrode current collector, and a second connection step of weld-connecting the first positive electrode current collector to the second positive electrode current collector after the fixation step and the first connection step.

12 Claims, 8 Drawing Sheets

(51) Int. Cl.
*H01M 10/0587* (2010.01)
*H01M 50/103* (2021.01)
*H01M 50/531* (2021.01)
*H01M 50/538* (2021.01)
*H01M 50/543* (2021.01)
*H01M 10/0585* (2010.01)
*H01M 50/528* (2021.01)
*H01M 50/169* (2021.01)
*H01M 50/15* (2021.01)
*H01M 50/60* (2021.01)
*H01M 50/54* (2021.01)

(52) U.S. Cl.
CPC ..... *H01M 10/0587* (2013.01); *H01M 50/103* (2021.01); *H01M 50/531* (2021.01); *H01M 50/538* (2021.01); *H01M 50/543* (2021.01); *H01M 10/049* (2013.01); *H01M 10/0585* (2013.01); *H01M 50/15* (2021.01); *H01M 50/169* (2021.01); *H01M 50/528* (2021.01); *H01M 50/54* (2021.01); *H01M 50/60* (2021.01); *Y02E 60/10* (2013.01); *Y02P 70/50* (2015.11)

(58) Field of Classification Search
CPC ............ H01M 2/263; H01M 10/0525; H01M 2/0426; H01M 2/22; H01M 2/0473; H01M 2/266; H01M 10/049; H01M 10/0431; H01M 10/0585; H01M 2/36; H01M 50/538; H01M 50/5314; H01M 50/543; H01M 50/103; H01M 50/531; H01M 50/0525; H01M 50/169; H01M 50/15; H01M 50/528; H01M 50/54; H01M 50/60; Y02E 60/10; Y02P 70/50
USPC ....................................................... 429/178
See application file for complete search history.

(56) References Cited

U.S. PATENT DOCUMENTS

| | | |
|---|---|---|
| 2010/0266894 A1 | 10/2010 | Byun et al. |
| 2011/0195287 A1 | 8/2011 | Kamifuji et al. |
| 2012/0251874 A1 | 10/2012 | Guen |
| 2012/0301759 A1* | 11/2012 | Yoshitake ........... H01M 2/0277 429/94 |
| 2012/0308855 A1 | 12/2012 | Shimizu et al. |
| 2012/0315516 A1* | 12/2012 | Kim ................. H01M 10/0525 429/61 |
| 2013/0252053 A1* | 9/2013 | Woo ........................ H01M 2/26 429/94 |
| 2015/0104694 A1* | 4/2015 | Okuda .................... H01M 2/22 429/162 |
| 2016/0133995 A1 | 5/2016 | Hattori et al. |
| 2016/0164133 A1* | 6/2016 | Matsumoto ......... H01M 10/049 429/179 |

FOREIGN PATENT DOCUMENTS

| | | |
|---|---|---|
| JP | 11-354095 A | 12/1999 |
| JP | 2001-38475 A | 2/2001 |
| JP | 2005-142026 A | 6/2005 |
| JP | 2005-267945 A | 9/2005 |
| JP | 2006-228551 A | 8/2006 |
| JP | 2008-226625 A | 9/2008 |
| JP | 2009-32640 A | 2/2009 |
| JP | 2009-170137 A | 7/2009 |
| JP | 2010-257945 A | 11/2010 |
| JP | 2011-165515 A | 8/2011 |
| JP | 2011-192547 A | 9/2011 |
| JP | 2012-209238 A | 10/2012 |
| JP | 2015-225740 A | 12/2015 |
| WO | 2015/001718 A1 | 1/2015 |

OTHER PUBLICATIONS

English Translation of CN Office Action dated Jan. 4, 2021, issued in counterpart CN Application No. 201780041126.5. (4 pages).

* cited by examiner

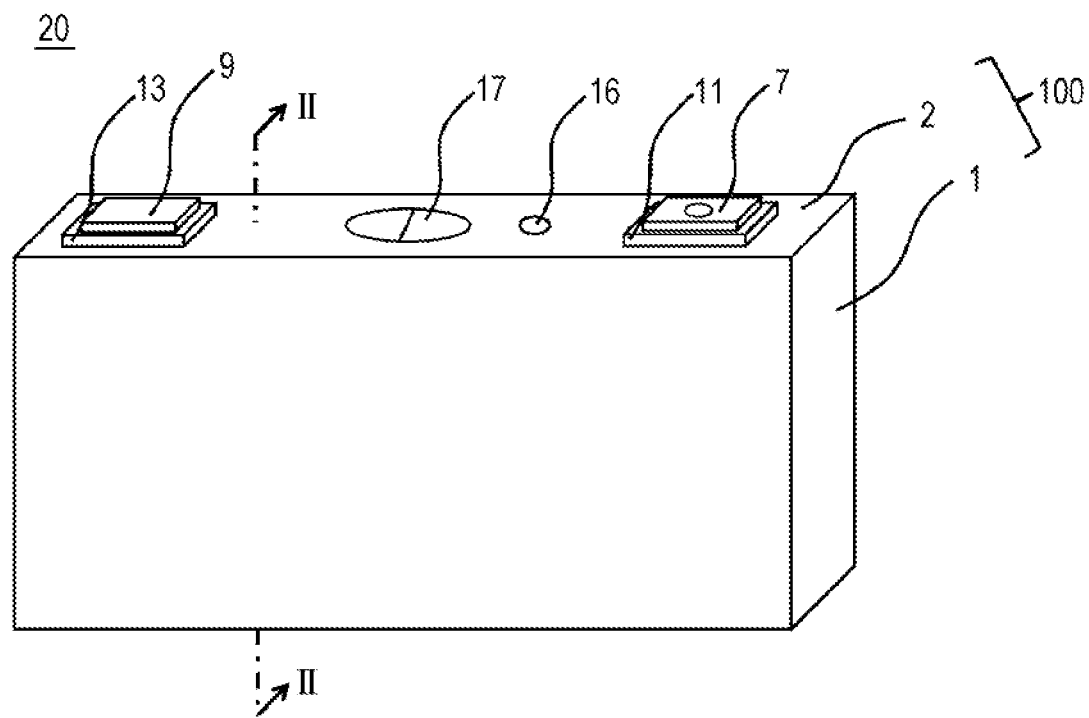
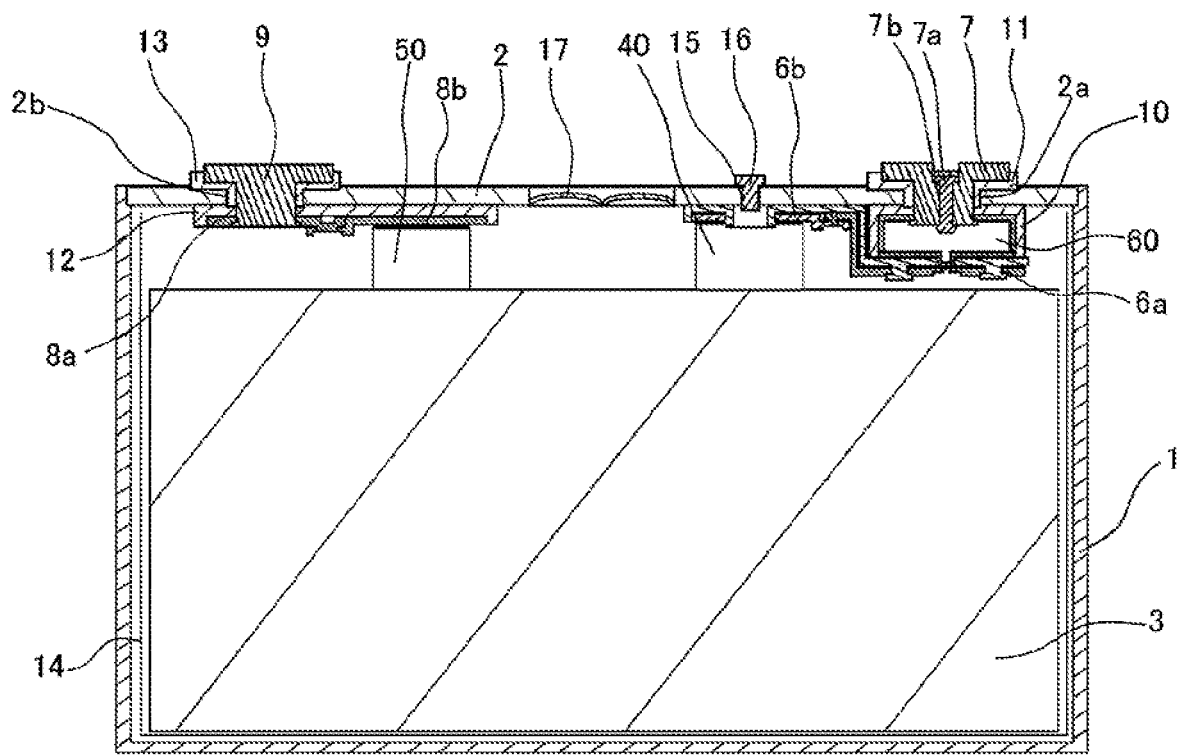

METHOD FOR PRODUCING SECONDARY BATTERY

TECHNICAL FIELD

The present invention relates to a method for producing a secondary battery.

BACKGROUND ART

Prismatic secondary batteries, such as alkaline secondary batteries and non-aqueous electrolyte secondary batteries, are used as driving power sources for electric vehicles (EVs), hybrid electric vehicles (HEVs, PHEVs), and other vehicles.

In such a prismatic secondary battery, a battery case includes a bottomed, cylindrical prismatic outer body having an opening, and a sealing plate that seals the opening. The battery case houses, together with an electrolyte, an electrode body including a positive electrode plate, a negative electrode plate, and separator. A positive electrode terminal and a negative electrode terminal are attached to the sealing plate. The positive electrode terminal is electrical connected to the positive electrode plate with a positive electrode current collector interposed therebetween. The negative electrode terminal is electrically connected to the negative electrode plate with a negative electrode current collector interposed therebetween.

The positive electrode plate includes a positive electrode core made of metal and a positive electrode active material mixture layer formed on the surface of the positive electrode core. A positive electrode core-exposed portion without the positive electrode active material mixture layer is formed on part of the positive electrode core. A positive electrode current collector is connected to the positive electrode core-exposed portion. The negative electrode plate includes a negative electrode core made of metal and a negative electrode active material mixture layer formed on the surface of the negative electrode core. A negative electrode core-exposed portion without the negative electrode active material mixture layer is formed on part of the negative electrode core. A negative electrode current collector is connected to the negative electrode core-exposed portion.

For example, Patent Literature 1 proposes a prismatic secondary battery including a wound electrode body having a wound positive electrode core-exposed portion in one end part and having a wound negative electrode core-exposed portion in the other end part. Patent Literature 2 proposes a prismatic secondary battery including an electrode body having a positive electrode core-exposed portion and a negative electrode core-exposed portion in one end part.

CITATION LIST

Patent Literature

Patent Literature 1: Japanese Published Unexamined Patent Application No. 2009-032640
Patent Literature 2: Japanese Published Unexamined Patent Application No. 2008-226625

SUMMARY OF INVENTION

Technical Problem

For secondary batteries for use in vehicles, particularly, secondary batteries for use in EVs, PHEVs, and other vehicles, there is a need to develop secondary batteries having a high volumetric energy density and a large battery capacity. In the case of the prismatic secondary battery disclosed in Patent Literature 1, a battery case needs to contain left and right spaces used to dispose the wound positive electrode core-exposed portion and the wound negative electrode core-exposed portion, and an upper space between a sealing plate and the wound electrode body. These spaces impose a difficulty in increasing the volumetric energy density of secondary batteries.

Like the prismatic secondary battery disclosed in Patent Literature 2, the use of the electrode body including the positive electrode core-exposed portion and the negative electrode core-exposed portion in one end part makes it easy to provide a prismatic secondary battery having a high volumetric energy density.

The present invention is directed to a highly reliable secondary battery having a high volumetric energy density.

Solution to Problem

A method for producing a secondary battery according to an aspect of the present invention is a method for producing a secondary battery including:
an electrode body that includes a positive electrode plate and a negative electrode plate;
an outer body that has an opening and houses the electrode body;
a sealing plate that seals the opening;
an external terminal that is attached to the sealing plate;
a tab that is provided in the positive electrode plate or the negative electrode plate; and
a first current collector and a second current collector that electrically connect the tab to the external terminal.

The method includes:
a fixation step of electrically connecting the first current collector to the external terminal and fixing the first current collector to the sealing plate;
a first connection step of weld-connecting a stack of a plurality of the tabs to the second current collector; and
a second connection step of connecting the first current collector to the second current collector after the fixation step and the first connection step.

According to the above-described features, there is provided a highly reliable secondary battery having a high volumetric energy density since a stack of a plurality of the tabs can stably and strongly be weld-connected to the second current collector. Here, either one of the fixation step and the first connection step may be performed first.

Advantageous Effects of Invention

According to the present invention, there is provided a highly reliable secondary battery having a high volumetric energy density.

BRIEF DESCRIPTION OF DRAWINGS

FIG. 1 is a perspective view of a prismatic secondary battery according to an embodiment.
FIG. 2 is a sectional view taken along line II-II in FIG. 1.

DESCRIPTION OF EMBODIMENTS

Figure 3:
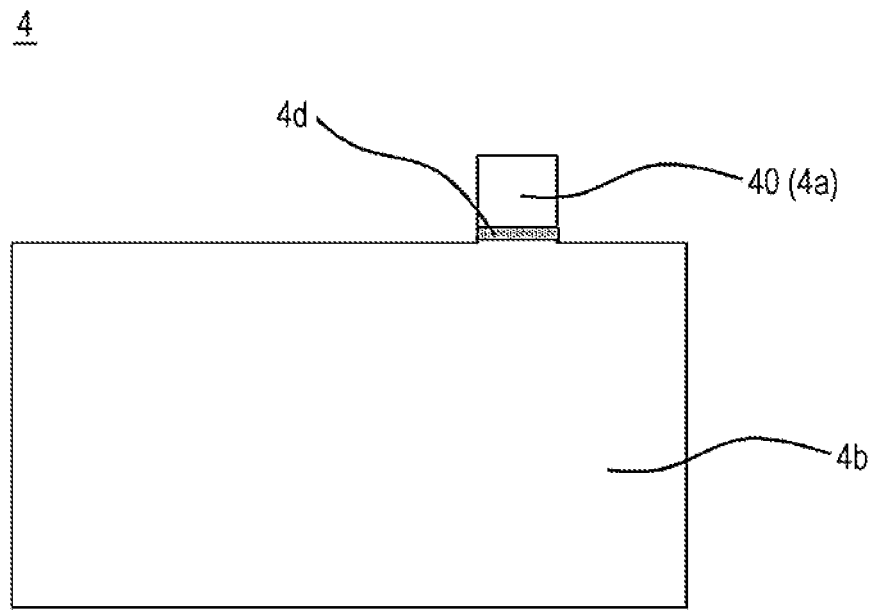
FIG. 3 is a plan view of a positive electrode plate according to an embodiment.

The structure of a prismatic secondary battery 20 according to an embodiment will be described below. The present invention is not limited to the following embodiment.

FIG. 1 is perspective view of the prismatic secondary battery 20. FIG. 2 is a sectional view taken along line II-II in FIG. 1. As illustrated in FIG. 1 and FIG. 2, the prismatic secondary battery 20 has a battery case 100. The battery case 100 includes a bottomed, cylindrical prismatic outer body 1 having an opening, and a sealing plate 2 that seals the opening of the prismatic outer body 1. The prismatic outer body 1 and the sealing plate 2 are preferably each made of metal, and preferably made of, for example, aluminum or an aluminum alloy. The prismatic outer body 1 houses, together with an electrolyte, an electrode body 3 including plural positive electrode plates and plural negative electrode plates that are stacked with separators each interposed therebetween. An insulating sheet 14 is disposed between the electrode body 3 and the prismatic outer body 1.

A positive electrode tab 40 and a negative electrode tab 50 are disposed on an edge of the electrode body 3 adjacent to the sealing plate 2. The positive electrode tab 40 is electrically connected to a positive electrode external terminal 7 with a second positive electrode current collector 6b and a first positive electrode current collector 6a interposed therebetween. The negative electrode tab 50 is electrically connected to a negative electrode external terminal 9 with a second negative electrode current collector 8b and a first negative electrode current collector 8a interposed therebetween.

The positive electrode tab 40 is connected to a surface of the second positive electrode current collector 6b adjacent to the electrode body 3. The positive electrode tab 40 is being bent. This configuration provides a secondary battery having a high volumetric energy density. The negative electrode tab 50 is connected to a surface of the second negative electrode current collector 8b adjacent to the electrode body 3. The negative electrode tab 50 is being bent. This configuration provides a secondary battery having a high volumetric energy density.

The positive electrode external terminal 7 is fixed to the sealing plate 2 with an external insulating member 11, which is made of resin, interposed therebetween. The negative electrode external terminal 9 is fixed to the sealing plate 2 with an external insulating member 13, which is made of resin, interposed therebetween. The positive electrode external terminal 7 is preferably made of metal, and more preferably made of aluminum or an aluminum alloy. The negative electrode external terminal 9 is preferably made of metal, and more preferably made of copper or a copper alloy. More preferably, the negative electrode external terminal 9 has a copper or copper alloy portion inside the battery case 100 and has an aluminum or aluminum alloy portion outside the battery case 100. The negative electrode external terminal 9 preferably has the surface coated with nickel or the like.

The conduction path between the positive electrode plate and the positive electrode external terminal 7 is provided with a current interrupting mechanism 60. The current interrupting mechanism 60 operates so as to interrupt the conduction path between the positive electrode plate and the positive electrode external terminal 7 when the internal pressure of the battery case 100 reaches a predetermined value or higher. The conduction path between the negative electrode plate and the negative electrode external terminal 9 may be provided with a current interrupting mechanism.

The sealing plate 2 has a gas release valve 17. The gas release valve 17 fractures when the internal pressure of the battery case 100 reaches a predetermined value or higher and releases gas in the battery case 100 to the outside of the battery case 100. The operating pressure of the gas release valve 17 is set to a value larger than the operating pressure of the current interrupting mechanism 60.

The sealing plate 2 has an electrolyte injection port 15. After an electrolyte is injected into the battery case 100 through the electrolyte injection port 15, the electrolyte injection port 15 is sealed with a sealing plug 16.

Next, a method for producing the prismatic secondary battery 20 will be described.

Production of Positive Electrode Plate

A positive electrode slurry containing a lithium-nickel-cobalt-manganese composite oxide as a positive electrode active material, polyvinylidene fluoride (PVdF) as a binder, a carbon material as a conductive agent, and N-methyl-2-pyrrolidone (NMP) as a dispersion medium is prepared. The positive electrode slurry is applied to each surface of an aluminum foil. The aluminum foil has a rectangular shape and, a thickness of 15 µm and functions as a positive electrode core. The positive electrode slurry is dried to remove N-methyl-2-pyrrolidone in the positive electrode slurry, whereby a positive electrode active material mixture layer is formed on the positive electrode core. The positive electrode active material mixture layer is then pressed into a predetermined thickness. The resulting positive electrode plate is cut into a predetermined shape.

FIG. 3 is a plan view of a positive electrode plate 4 prepared by using the above-described method. As illustrated in FIG. 3, the positive electrode plate 4 has a body having a positive electrode active material mixture layer 4b on each surface of a rectangular positive electrode core 4a. The positive electrode plate 4 has the positive electrode tab 40. The positive electrode core 4a projects from an edge of the body, and the projecting positive electrode core 4a constitutes the positive electrode tab 40. The positive electrode tab 40 may be a part of the positive electrode core 4a as illustrated in FIG. 3, or the positive electrode tab 40 may be formed by connecting another member to the positive electrode core 4a. Preferably, a part of the positive electrode tab 40 adjacent to the positive electrode active material mixture layer 4b has a positive electrode protective layer 4d. The positive electrode protective layer 4d has a larger electrical resistance than the positive electrode active material mixture layer 4b. The positive electrode protective layer 4d preferably contains a binder and ceramic particles made of alumina, silica, zirconia, or other ceramics. The positive electrode protective layer 4d more preferably contains conductive particles made of a carbon material or other materials.

Production of Negative Electrode Plate

A negative electrode slurry containing graphite as a negative electrode active material, a styrene-butadiene rubber (SBR) as a binder, carboxymethylcellulose (CMC) as a thickener, and water is prepared. The negative electrode slurry is applied to each surface of a copper foil. The copper foil has a rectangular shape and a thickness of 8 µm and functions as a negative electrode core. The negative electrode slurry is dried to remove water in the negative electrode slurry, whereby a negative electrode active material mixture layer is formed on the negative electrode core. The negative electrode active material mixture layer is then pressed into a predetermined thickness. The resulting negative electrode plate is cut into a predetermined shape.

Figure 4:
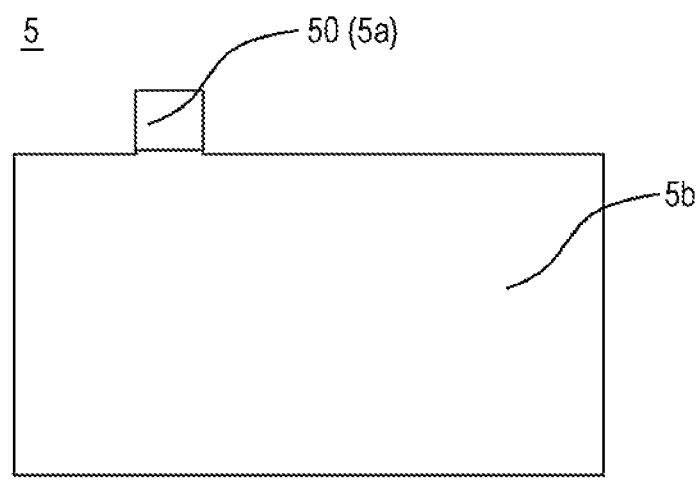
FIG. 4 is a plan view of a negative electrode plate according to an embodiment.

FIG. 4 is a plan view of a negative electrode plate 5 prepared by using the above-described method. As illustrated in FIG. 4, the negative electrode plate 5 has a body having a negative electrode active material mixture layer 5b on each surface of a rectangular negative electrode core 5a. The negative electrode plate 5 has a negative electrode tab 50. The negative electrode core 5a projects from an edge of the body, and the projecting negative electrode core 5a constitutes the negative electrode tab 50. The negative electrode tab 50 may be a part of the negative electrode core 5a as illustrated in FIG. 4, or the negative electrode tab 50 may be formed by connecting another member to the negative electrode core 5a.

Production of Electrode Body Element

Figure 5:
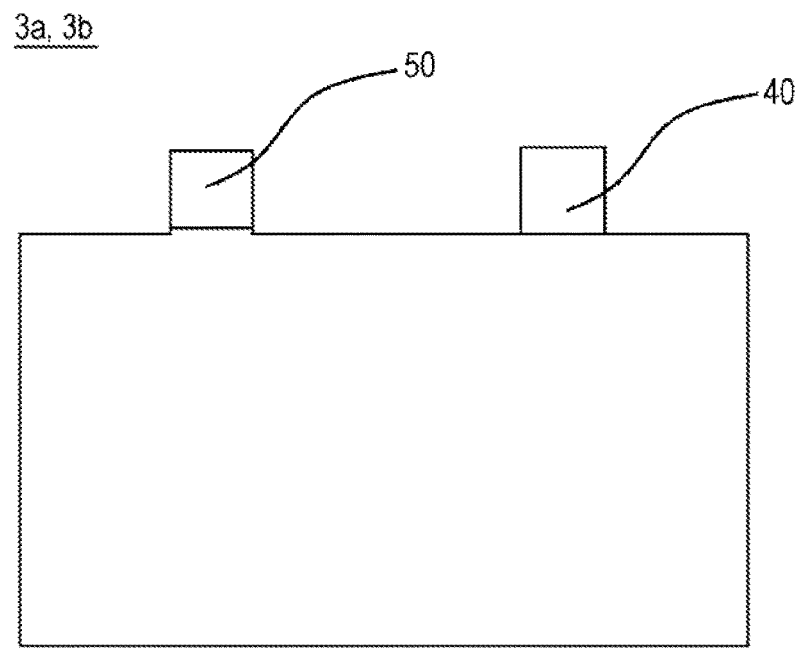
FIG. 5 is a plan view of an electrode body element according to an embodiment.

Stacked electrode body elements (3a, 3b) are produced as follows: preparing 50 positive electrode plates 4 and 51 negative electrode plates 5 by using the foregoing methods; and stacking the positive electrode plates 4 and the negative electrode plates 5 with rectangular polyolefin separators each interposed therebetween. As illustrated in FIG. 5, the stacked electrode body elements (3a, 3b) are produced so as to include the stacked positive electrode tabs 4 of the positive electrode plates 4 and the stacked negative electrode tabs 50 of negative electrode plates 5 on one edge. The separator is located on each outer surface of the electrode body elements (3a, 3b), the electrode plates and the separators are fixed to each other with a tape or the like such that they are stacked on top of one another. Alternatively, the separators may each have adhesive layers so that each separator adheres to a corresponding one of the positive electrode plates 4 and each separator adheres to a corresponding one of the negative electrode plates 5.

Preferably, the separators have the same size as the negative electrode plates 5 or have a larger size than the negative electrode plates 5 in plan view. The positive electrode plate 4 and the negative electrode plate 5 may be stacked on top of each other after the peripheries of two separators between which the positive electrode plate 4 is interposed e hot melted. To produce the electrode body elements (3a, 3b), the electrode plate 4 and the negative electrode plate 5 can also be stacked on top of each other by using a long separator while the long separator is bent in hairpin curves. Alternatively, the positive electrode plate 4 and the negative electrode plate 5 can also be stacked on top of each other by using a long separator while the long separator is wound.

Assembly of Sealing Body

With reference to FIG. 2, FIG. 6, FIG. 7, and FIG. 8, a method for attaching the positive electrode external terminal 7 and the first positive electrode current collector 6a to the sealing plate 2, and the structure of the current interrupting mechanism 60 will be described.

The external insulating member 11 is disposed on the outer surface side of a positive electrode terminal attachment hole 2a in the sealing plate 2, and an internal insulating member 10 and a cup-shaped conductive member 61 are disposed on the inner surface side of the positive electrode terminal attachment hole 2a. Next, the positive electrode external terminal 7 is inserted into the through-hole of the external insulating member 11, the positive electrode terminal attachment hole 2a of the sealing plate 2, the through-hole of the internal insulating member 10, and the through-hole of the conductive member 61. The end of the positive electrode external terminal 7 is crimped onto the conductive member 61. The positive electrode external terminal 7, the external insulating member 11, the sealing plate 2, the internal insulating member 10, and the conductive member 61 are fixed accordingly. The crimped portion of the positive electrode external terminal 7 is preferably welded to the conductive member 61 by means of laser welding or the like. The internal insulating member 10 and the external insulating member 11 are preferably each made of resin.

The conductive member 61 has an opening adjacent to the electrode body 3. A disc-shaped deformation plate 62 is placed so as to close the opening of the conductive member 61, and a peripheral portion of the deformation plate 62 is weld-connected to the conductive member 61. The opening of the conductive member 61 is sealed with the deformation plate 62 accordingly. The conductive member 61 and the deformation plate 62 are preferably each made of metal, and more preferably made of aluminum or an aluminum alloy. The opening of the conductive member 61 adjacent to the electrode body 3 does not necessarily have a circular shape, but may have a rectangular shape. The deformation plate 62 is shaped so as to seal the opening of the conductive member 61.

Next, a first insulating member 63 made of resin is disposed on the electrode body 3 side with respect to the deformation plate 62. Preferably, the first insulating member 63 has a connection part, and the connection part is connected to the internal insulating member 10. Preferably, the first insulating member 63 has a claw-shaped hook fixation part, the conductive member 61 has a flange, a recess, or a protrusion, and the hook fixation part of the first insulating member 63 is fixed to the flange, the recess, or the protrusion of the conductive member 61.

The first insulating member 63 has a fixation protrusion 63a on its surface adjacent to the electrode body 3. The first insulating member 63 preferably has an insulating member first region 63x disposed below the deformation plate 62, an insulating member second region 63y extending from the end of the insulating member first region 63x toward the sealing plate 2, and an insulating member third region 63z horizontally extending from the end of the insulating member second region 63y. The insulating member third region 63z has an insulating member opening 63b at a position facing the electrolyte injection port 15 of the sealing plate 2. An insulating member protrusion 63c protruding toward the electrode body 3 is disposed at the edge of the insulating member opening 63b.

Figure 6:
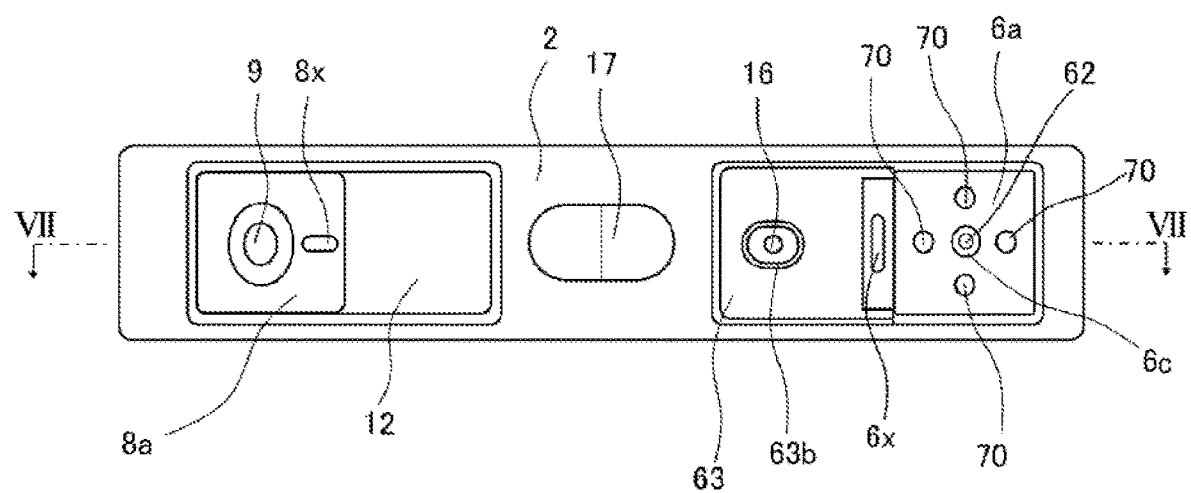
FIG. 6 is a bottom view of a sealing plate to which each component has been attached.

Next, the first positive electrode current collector 6a is disposed on the electrode body 3 side with respect to the first insulating member 63. The first positive electrode current collector 6a has a fixation through-hole 6d. The fixation protrusion 63a of the first insulating member 63 is inserted into the fixation through-hole 6d of the first positive electrode current collector 6a, and the diameter of the end of the fixation protrusion 63a is enlarged. As a result, the first insulating member 63 and the first positive electrode current collector 6a are fixed to each other. A fixation part 70 is formed accordingly. As illustrated in FIG. 6, four fixation parts 70 are preferably provided so as to surround the connection part between the deformation plate 62 and the first positive electrode current collector 6a.

The deformation plate 62 and the first positive electrode current collector 6a are then weld-connected to each other through a through-hole in the first insulating member 63. Preferably, the first positive electrode current collector 6a has a thin portion 6c, and the thin portion 6c is preferably weld-connected to the deformation plate 62. Preferably, the thin portion 6c has an opening at its center, and a peripheral portion of the opening is weld-connected to the deformation plate 62. The thin portion 6c more preferably has an annular notch that surrounds the connection part between the deformation plate 62 and the first positive electrode current collector 6a. The first insulating member 63 and the first positive electrode current collector 6a may be connected to each other in advance, and the first insulating member 63 connected to the first positive electrode current collector 6a may be disposed on the electrode body 3 side with respect to the deformation plate 62.

When the internal pressure of the battery case 100 reaches a predetermined value or higher, the deformation plate 62 deforms such that a central portion of the deformation plate 62 moves upward (toward the positive electrode external terminal 7). The thin portion 6c of the first positive electrode current collector 6a fractures upon deformation of the deformation plate 62. The fracture causes disconnection of the conduction path between the positive electrode plate 4 and the positive electrode external terminal 7.

The leak inspection on the connection part between the conductive member 61 and the deformation plate 62 can be carried out by supplying gas to the inside of the current interrupting mechanism 60 through a terminal through-hole 7b formed in the positive electrode external terminal 7. While the gas causes the deformation plate 62 to push against the first positive electrode current collector 6a, the deformation plate 62 and the first positive electrode current collector 6a can be weld-connected to each other. Finally, the terminal through-hole 7b is sealed with a terminal sealing member 7a. The terminal sealing member 7a preferably includes a metal plate 7x and a rubber member 7y.

The first positive electrode current collector 6a has a current collector first region 6a1 disposed below the deformation plate 62, a current collector second region 6a2 extending from an end of the current collector first region 6a1 toward the sealing plate 2, and a current collector third region 6a3 horizontally extending from an upper end of the current collector second region. The current collector third region 6a3 has a current collector protrusion 6x on its surface adjacent to the electrode body 3.

The current collector first region 6a1 of the first positive electrode current collector 6a is disposed so as to face the insulating member first region 63x of the first insulating member 63. The current collector second region 6a2 of the first positive electrode current collector 6a is disposed so as to face the insulating member second region 63y of the first insulating member 63. The current collector third region 6a3 of the first positive electrode current collector 6a is disposed so as to face the insulating member third region 63z of the first insulating member 63.

With reference to FIG. 2, FIG. 6, FIG. 7, and FIG. 9, a method for attaching the negative electrode external terminal 9 and the first negative electrode current collector 8a to the sealing plate 2 will be described.

The external insulating member 13 is disposed on the outer surface side of a negative electrode terminal attachment hole 2b in the sealing plate 7 and an internal insulating member 12 and the first negative electrode current collector 8a are disposed on the inner surface side of the negative electrode terminal attachment hole 7b. Next, the negative electrode external terminal 9 is inserted into the through-hole of the external insulating member 13, the negative electrode terminal attachment hole 2b of the sealing plate 2, the through-hole of the internal insulating member 12, and the through-hole of the first negative electrode current collector 8a. The end of the negative electrode external terminal 9 is crimped onto the first negative electrode current collector 8a. The external insulating member 13, the sealing plate 2, the internal insulating member 12, and the first negative electrode current collector 8a are fixed accordingly. The crimped portion of the negative electrode external terminal 9 is preferably weld-connected to the first negative electrode current collector 8a by means of laser welding or the like. The internal insulating member 12 and the external insulating member 13 are preferably each made of resin.

Connection between Second Current Collector and Tabs

Figure 10:
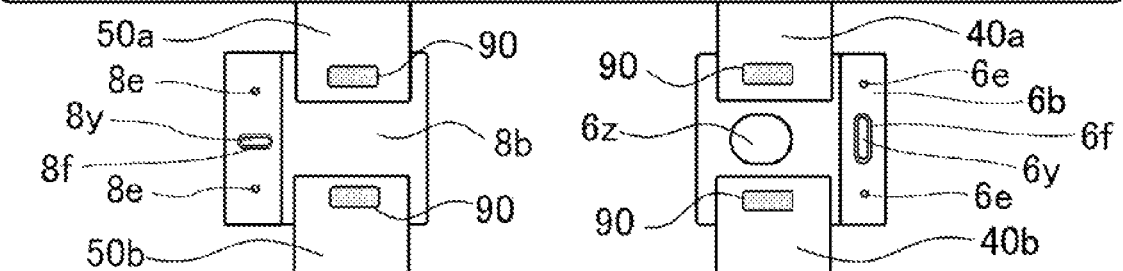
FIG. 10 is a view illustrating the process of connecting tabs to second current collectors.

FIG. 10 is a illustrating a method for connecting the positive electrode tabs 40 (40a, 40b) to the second positive electrode current collector 6b, and a method for connecting the negative electrode tabs 50 (50a, 50b) to the second negative electrode current collector 8b. Two electrode body elements are produced by using the above-described method and defined as a first electrode body element 3a and a second electrode body element 3b. The first electrode body element 3a and the second electrode body element 3b may have the completely same structure or may have different structures.

The second positive electrode current collector 6b and the second negative electrode current collector 6b are disposed between the first electrode body element 3a and the second electrode body element 3b. The stacked positive electrode tabs 40a protruding from the first electrode body element 3a are disposed on the second positive electrode current collector 6b. The stacked negative electrode tabs 50a protruding from the first electrode body element 3a are disposed of the second negative electrode current collector 8b. The stacked positive electrode tabs 40b protruding from the second electrode body element 3b are disposed on the second positive electrode current collector 6b. The stacked negative electrode tabs 50b protruding from the second electrode body element 3b are disposed on the second negative electrode current collector 8b. The positive electrode tabs 40a and the positive electrode tabs 40b are weld-connected to the second positive electrode current collector 6b to form weld-connected parts 90. The negative electrode tabs 50a and the negative electrode tabs 50b are weld-connected to the second negative electrode current collector 8b to form weld-connected parts 90. Weld connection is preferably performed in the following manner.

Figure 11:
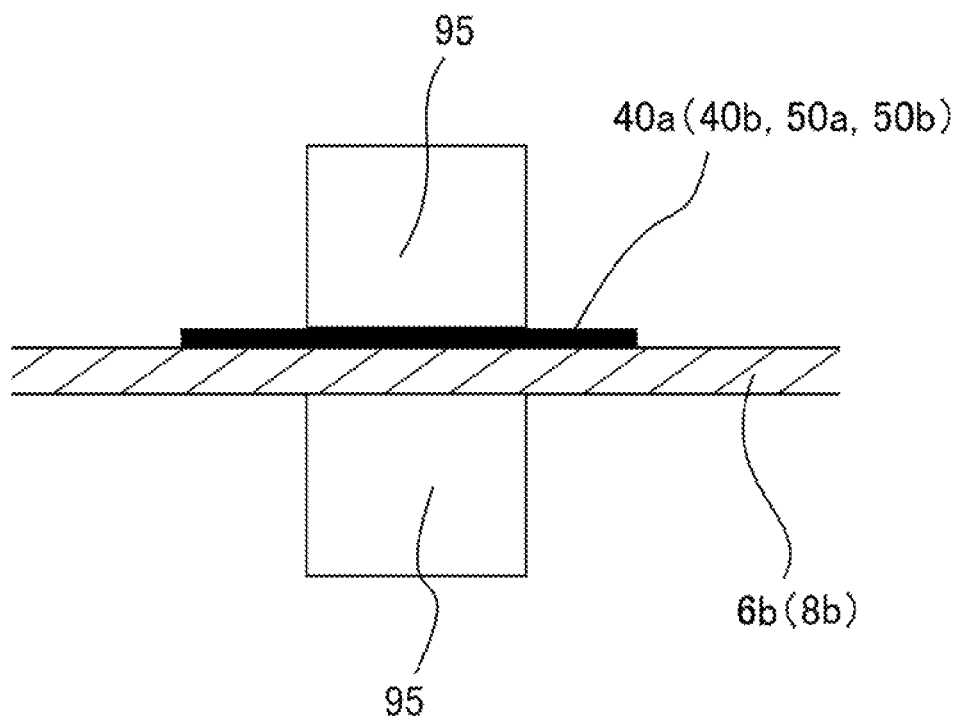
FIG. 11 is a sectional view illustrating the process of connecting the tabs to the second current collectors.

As illustrated in FIG. 11, the tabs (the positive electrode tabs 40a or 40b, the negative electrode tabs 50a or 50b) and the current collector (the second positive electrode current collector 6b, the second negative electrode current collector 8b) are sandwiched between welding jigs 95 from above and below. In this state, welding is performed. The welding method is preferably ultrasonic welding or resistance welding. Such welding ensures weld connection between. the stacked tabs and the current collector. In the case where many tabs are stacked, for example, in the case where 20 or more tabs are stacked, ultrasonic welding or resistance welding can form more reliable weld-connected parts than laser welding or the like because ultrasonic welding or resistance welding can be performed with the tabs and the current collector sandwiched between a pair of welding jigs 95. In resistance welding, the pair of welding jigs 95 is a pair of resistance welding electrodes. In ultrasonic welding, the pair of welding jigs 95 correspond to a horn and an anvil.

The positive electrode tabs 40a of the first. electrode body element 3a are connected to one side of the second positive electrode current collector 6b with respect to a central portion of the second positive electrode current collector 6b in the width direction. The positive electrode tabs 40b of the second electrode body element 3b are connected to the other side of the second positive electrode current collector 6b with respect to a central portion of the second positive electrode current collector 6b in the width direction.

The negative electrode tabs 50a of the first electrode body element 3a are connected to one side of the second negative electrode current collector 8b with respect to a central portion of the second negative electrode current collector 8b in the width direction. The negative electrode tabs 50b of the second electrode body element 3b are connected to the other side of the second negative electrode current collector 8b with respect to a central portion of the second negative electrode current collector 8b in the width direction.

As illustrated in FIG. 10, the second positive electrode current collector 6b has an opening 6z. After the second positive electrode current collector 6b is connected to the first positive electrode current collector 6a, the opening 6z is placed at a position corresponding to the electrolyte injection port 15 of the sealing plate 2. The positive electrode tabs 40a of the first electrode body element 3a are connected to one side of the second positive electrode current collector 6b with respect to the opening 6z in the width direction of the second positive electrode current collector 6b. The positive electrode tabs 40b of the second electrode both element 3 are connected to the other side of the second positive electrode current collector 6b with respect to the opening 6z the width direction of the second positive electrode current collector 6b. As the second positive electrode current collector 6b, the positive electrode tabs 40a, and the positive electrode tabs 40b are viewed in the direction perpendicular to the sealing plate 2, portions of the positive electrode tabs 40a and the positive electrode tabs 40b substantially parallel to the second positive electrode current collector 6b preferably do not overlap the opening 6z. This configuration can avoid the second positive electrode current collector 6b or the positive electrode tabs 40a and the positive electrode tabs 40b from interfering with injection of an electrolyte.

Here, either one of the following steps may be performed first: a fixation step of fixing the first positive electrode current collector 6a and the first negative electrode current collector 8a to the sealing plate 2; and a connection step of respectively connecting the positive electrode tabs 40 and the negative electrode tabs 50 to the second positive electrode current collector 6b and the second negative electrode current collector 8b. Preferably, after the positive electrode tabs are connected to the second positive electrode current collector and the negative electrode tabs are connected to the second negative electrode current collector, the second positive electrode current collector is connected to the first positive electrode current collector, and the second negative electrode current collector is connected to the first negative electrode current collector.

Figure 7:
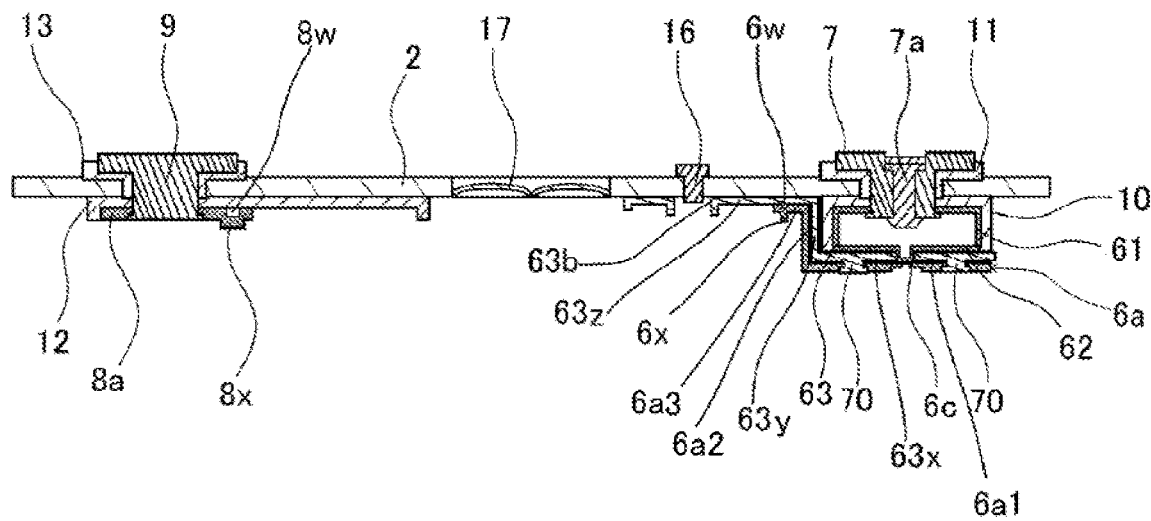
FIG. 7 is a sectional view taken along line VII-VII in FIG. 6.
Figure 8:
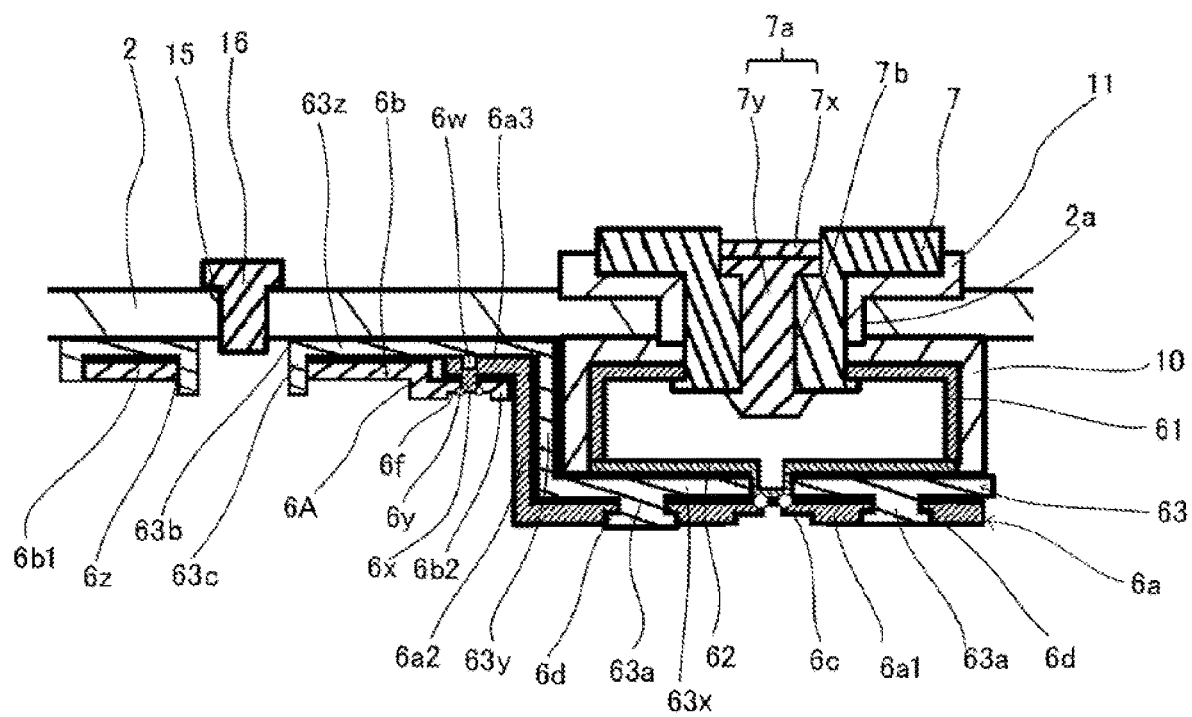
FIG. 8 is an enlarged view illustrating the first positive electrode current collector, the second positive electrode current collector, the current interrupting mechanism, and the surrounding area in FIG. 7.

Connection between First Positive Electrode Current Collector and Second Positive Electrode Current Collector As illustrated in FIG. 6 and FIG. 7, the first positive electrode current collector 6a has a current collector protrusion 6x. As illustrated in FIG. 10, the second positive electrode current collector 6b has a current collector opening 6y. As illustrated in FIGS. 7 and 8, the second positive electrode current collector 6b is placed on the insulating member third region 63z of the first insulating member 63 such that the current collector protrusion 6x of the first positive electrode current collector 6a is positioned in the current collector opening 6y of the second positive electrode current collector 6b. The current collector protrusion 6x of the first positive electrode current collector 6a is welded to the edge of the current collector opening 6y of the second positive electrode current collector 6b by means of irradiation with an energy ray, such as a laser. The first positive electrode current collector 6a and the second positive electrode current collector 6b are connected each other accordingly. The second positive electrode current collector 6b has current collector first recess 6f around the current collector opening 6y. In other words, the current collector opening 6y is formed at the center of the current collector first recess 6f. The first positive electrode current collector 6a and the second positive electrode current collector 6b are weld-connected to each other at the current collector first recess 6f. When the current collector first recess 61 is formed around the current collector opening 6y, the first positive electrode current collector 6a and the second positive electrode current collector 6b can be weld-connected to each other without increasing the height of the current collector protrusion 6x.

As illustrated in FIG. 8, the second positive electrode current collector 6b has a tab connection region 6b1 to which the positive electrode tabs 40 are connected, and a current collector connection region 6b2 to which the first positive electrode current collector 6a is connected. A stepped part 6A is formed between the tab connection region 6b1 and the current collector connection region 6b2. In the direction perpendicular to the sealing plate 2, the distance between the sealing plate 2 and the tab connection region 6b1 is smaller than the distance between the sealing plate 2 and the current collector connection region 6b2. Such a configuration results in a small space occupied by the current collection part and provides a secondary battery having a high volumetric energy density. The tab connection region 6b1 is preferably disposed substantially parallel (e.g., at an angle of ±20° or less) to the sealing plate 2.

As illustrated in FIG. 10, the second positive electrode current collector 6b has target holes 6e on both sides of the current collector opening 6y. During welding between the first positive electrode current collector 6a and the second positive electrode current collector 6b by means of irradiation with an energy ray, such as a laser, the target holes 6e are preferably used as targets for image correction. Preferably, position correction is performed by detecting the target holes 6e on the image, and irradiation with energy rays is performed along the shape of the current collector opening 6y. Each target hole 6e may be a recess instead of a through-hole. The area of each target hole 6e in plan view is preferably smaller than the area of the current collector opening 6y in plan view. In the width direction of the second positive electrode current collector 6b, the current collector opening 6y is preferably aligned with the target holes 6e.

As illustrated in FIG. 8, a current collector second recess 6w is formed in a surface of the first positive electrode current collector 6a that faces the first insulating member 63 and that is located on the back side of the current collector protrusion 6x. This configuration is preferred because it is easy to form a large weld-connected part between the first positive electrode current collector 6a and the second positive electrode current collector 6b. The formation of the current collector second recess 6w can protect the first insulating member from damage caused by welding heat during weld connection between the first positive electrode current collector 6a and the second positive electrode current collector 6b.

As illustrated in FIG. 8 the lower end (the end adjacent to the electrode body 3) of the insulating member protrusion 63c of the first insulating member 63 preferably protrudes downward (toward the electrode body 3) beyond the lower surface of the second positive electrode current collector 6b around the opening 6z. This configuration can assuredly avoid contact between the sealing plug 16 and the second positive electrode current collector 6b. Such contact is effectively avoided when the sealing plug 16 that seals the electrolyte injection port 15 in the sealing plate 2 protrudes downward (toward the electrode body 3) beyond the lower surface of the sealing plate 2. The insulating member protrusion 63c preferably has an annular shape. However, the insulating member protrusion 63c does not necessarily have an annular shape and may have a partially cut annular shape.

The second positive electrode current collector 6b has the opening 6z at a position facing the electrolyte injection port 15 formed the sealing plate 2. The insulating member third region 63z of the first insulating member 63 preferably has a fixation part to be fixed to the second positive electrode current collector 6b. For example, a claw-shaped fixation part can be formed in the first insulating member 63 and can be hooked on and fixed to the second positive electrode current collector 6b. Alternatively, the first insulating member 63 may be fixed to the second positive electrode current collector 6b as follows: forming a protrusion in the first insulating member 63; forming an opening or cut for fixation the second positive electrode current collector 6b; inserting the protrusion of the first insulating member 63 into the opening or cut for fixation in the second positive electrode current collector 6b; and enlarging the diameter of the end of the protrusion of the first insulating member 63.

As illustrated in FIG. 8, the insulating member first region 63x of the first insulating member 63 is disposed so as to face the current collector first region 6a1 of the first positive electrode current collector 6a. The insulating member second region 63y of the first insulating member 63 is disposed so as to face the current collector second region 6a2 of the first positive electrode current collector 6a. This configuration can assuredly avoid formation of a conduction path between the first positive electrode current collector 6a and the deformation plate 62 or between the first positive electrode current collector 6a and the conductive member 61 after the current interrupting mechanism 60 operates to disconnect electrical connection between the first positive electrode current collector 6a and the deformation plate 62.

Figure 9:
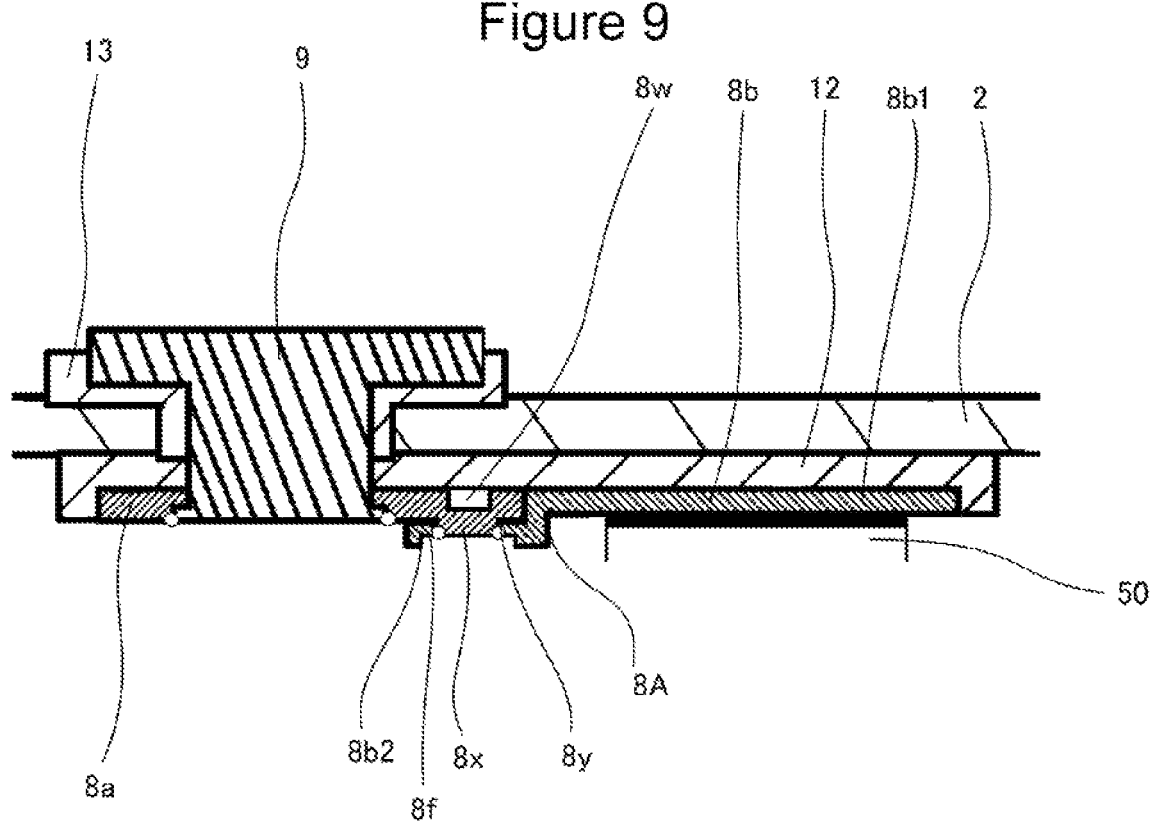
FIG. 9 is an enlarged view illustrating the first negative electrode current collector, the second negative electrode current collector, and the surrounding area in FIG. 7.
Figure 12:
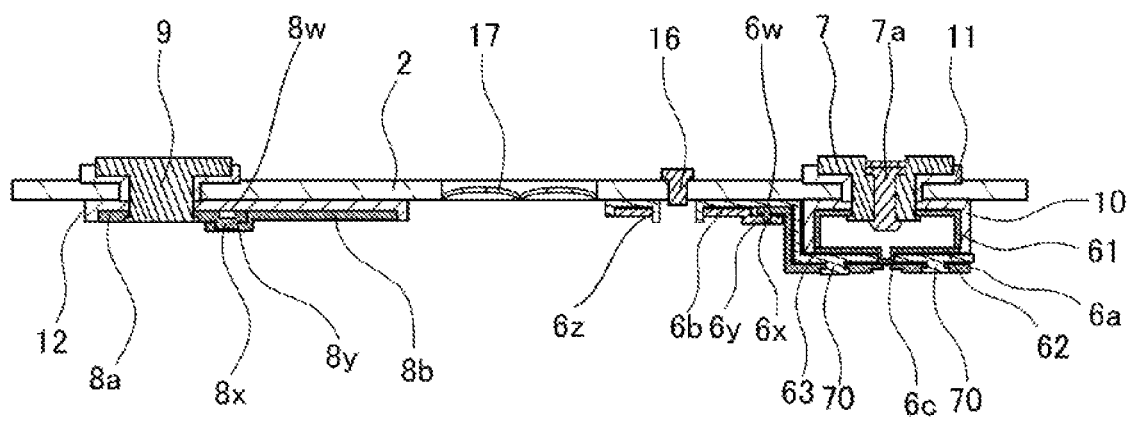
FIG. 12 is a sectional view in the longitudinal direction of the sealing plate after the second positive electrode current collector is connected to the first positive electrode current collector and the second negative electrode current collector is connected to the first negative electrode current collector.

Connection between First Negative Electrode Current Collector and Second Negative Electrode Current Collector As illustrated in FIG. 6 and FIG. 7, the first negative electrode current collector 8a has a current collector protrusion 8x. As illustrated in FIG. 9 and FIG. 12, the second negative electrode current collector 8b has a current collector opening 8y. As illustrated in FIG. 12, the second negative electrode current collector 8b is placed on the internal insulating member 12 such that the current collector protrusion 8x of the first negative electrode current collector 8a is positioned in the current collector opening 8y of the second negative electrode current collector 8b. The current collector protrusion 8x of the first negative electrode current collector 8a is welded to the edge of the current collector opening 8y of the second negative electrode current collector 8b by means of irradiation with an energy ray, such as a laser. The first negative electrode current collector 8a and the second negative electrode current collector 8b are connected to each other accordingly. The second negative electrode current collector 8b has a current collector first recess 8f around the current collector opening 8y. In other words, the current collector opening 8y is formed at the center of the current collector first recess 8f. The first negative electrode current collector 8a and the second negative electrode current collector 8b are weld-connected to each other at the current collector first recess 8f. Like the second positive electrode current collector 6b, the second negative electrode current collector 8b has target holes 8e.

The first negative electrode current collector 8a and the second negative electrode current collector 8b are preferably made of copper or a copper alloy. The first negative electrode current collector 8a and the second negative electrode current collector 8b each preferably have a nickel layer on their surfaces. A nickel layer is preferably formed on the surface of the current collector protrusion 8x of the first negative electrode current collector 8a. A nickel layer is preferably formed on the surface of the second negative electrode current collector 8b at the edge of the current collector opening 8y.

As illustrated in FIG. 9, a current collector second recess 8w is formed in a surface of the first negative electrode current collector 8a that faces the internal insulating member 12 and that is located on the back side of the current collector protrusion 8x. This configuration is preferred because it is easy to form a large weld-connected part between the first negative electrode current collector 8a and the second negative electrode current collector 8b. The formation of the current collector second recess 8w can protect the internal insulating member 12 from damage caused by welding heat during weld connection between the first negative electrode current collector 8a and the second negative electrode current collector 8b.

As illustrated in FIG. 9, the second negative electrode current collector 8b has a tab connection region 8b1 to which the negative electrode tabs 50 are connected, and a current collector connection region 8b2 to which the first negative electrode current collector 8a is connected. A stepped part 8A is formed between the tab connection region 8b1 and the current collector connection region 8b2. In the direction perpendicular to the sealing plate 2, the distance between the sealing plate 2 and the tab connection region 8b1 is smaller than the distance between the sealing plate 2 and the current collector connection region 8b2. Such a configuration results in a small space occupied by the current collection part and provides a secondary battery having a high volumetric energy density.

The internal insulating member 12 preferably has a fixation part to be fixed to the second negative electrode current collector 8b. For example, a claw-shaped fixation part can be formed in the internal insulating member 12 and can be hooked on and fixed to the second negative electrode current collector 8b. Alternatively, the internal insulating member 12 may be fixed to the second negative electrode current collector 8b as follows: forming a protrusion in the internal insulating member 12; forming an opening or cut for fixation in the second negative electrode current collector 8b; inserting the protrusion of the internal insulating member 12 into the opening or cut for fixation in the second negative electrode current collector 8b; and enlarging the diameter of the end of the protrusion of the internal insulating member 12.

Since the shape of the current collector protrusion 6x in the first positive electrode current collector 6a is different from the shape of the current collector protrusion 8x the first negative electrode current collector 8a, this configuration can assuredly avoid accidental connection between the first positive electrode current collector 6a and the second negative electrode current collector 8b or between the first negative electrode current collector 8a and the second positive electrode current collector 6b.

The current collector protrusion 6x in the first positive electrode current collector 6a is formed such that the major axis of the current collector protrusion 6x extends in the transverse direction of the sealing plate 2. The current collector protrusion 8x in the first negative electrode current collector 8a is formed such that the major axis of the current collector protrusion 8x extends in the longitudinal direction of the sealing plate 2. Such a configuration can absorb a difference between the center-to-center distance between the current collector protrusion 6x in the first positive electrode current collector 6a and the current collector protrusion 8x in the first negative electrode current collector 8a and the center-to-center distance between the current collector opening 6y in the second positive electrode current collector 6b and the electrode current collector opening 8y in the second negative electrode current collector 8b. This configuration can avoid the possibility of assembly defects in the case of positioning both on the positive electrode side and the negative electrode side and the possibility of low positional accuracy due to a failure of positioning on one electrode side in the case of positioning on the other electrode side.

The shape of the current collector protrusion 6x in the first positive electrode current collector 6a is preferably different from the shape of the current collector protrusion 8x in the first negative electrode current collector 8a. The current collector protrusion 6x and the current collector protrusion 8x preferably have a non-perfect circular shape and preferably have a rectangular shape, an elliptical shape, or a track shape.

In the case where one of the current collector protrusion 6x in the first positive electrode current collector 6a and the current collector protrusion 8x in the first negative electrode current collector 8a has a major axis direction different from that of the other, the current interrupting mechanism is preferably provided on the positive electrode side, the major axis of the current collector protrusion 6x in the first positive electrode current collector 6a preferably extends in the transverse direction of the sealing plate 2, and the major axis of the current collector protrusion 8x in the first negative electrode current collector 8a preferably extends in the longitudinal direction of the sealing plate 2. This configuration can reduce a space occupied by the current collection part.

Production of Electrode Body

The positive electrode tabs 40a, the positive electrode tabs 40b, the negative electrode tabs 50a, and the negative electrode tabs 50b are bent such that the upper surface of the first electrode body element 3a and the upper surface of the second electrode body element 3b in FIG. 10 comes into contact with each other. Accordingly, the first electrode body element 3a and the second electrode body element 3b are combined together into one electrode body 3.

Assembly of Prismatic Secondary Battery

The electrode body 3 attached to the sealing plate 2 is covered with the insulating sheet 14 and inserted into the prismatic outer body 1. The insulating sheet 14 is preferably formed by bending a flat insulating sheet in a box shape or bag shape. The opening of the prismatic outer body 1 is closed by joining the sealing plate 2 and the prismatic outer body 1 by means of laser welding or the like. Subsequently, a non-aqueous electrolyte containing an electrolyte solvent and an electrolyte salt is injected through the electrolyte injection port 15 provided in the sealing plate 2. The electrolyte injection port 15 is sealed with the sealing plug 16.

Method for Producing Prismatic Secondary Battery

The above-described method can reduce the proportion of a space occupied by the current collection part including the positive electrode tabs 40, the first positive electrode current collector 6a, the second positive electrode current collector 6b, the negative electrode tabs 50, the first negative electrode current collector 8a, the second negative electrode current collector 8b, and other components, and can provide a secondary battery having a high volumetric energy density. According to the above-described configuration, there is provided a highly reliable secondary battery since a stack of a plurality of the tabs can stably and strongly be weld-connected to the second current collector.

Modification 1

Figure 13:
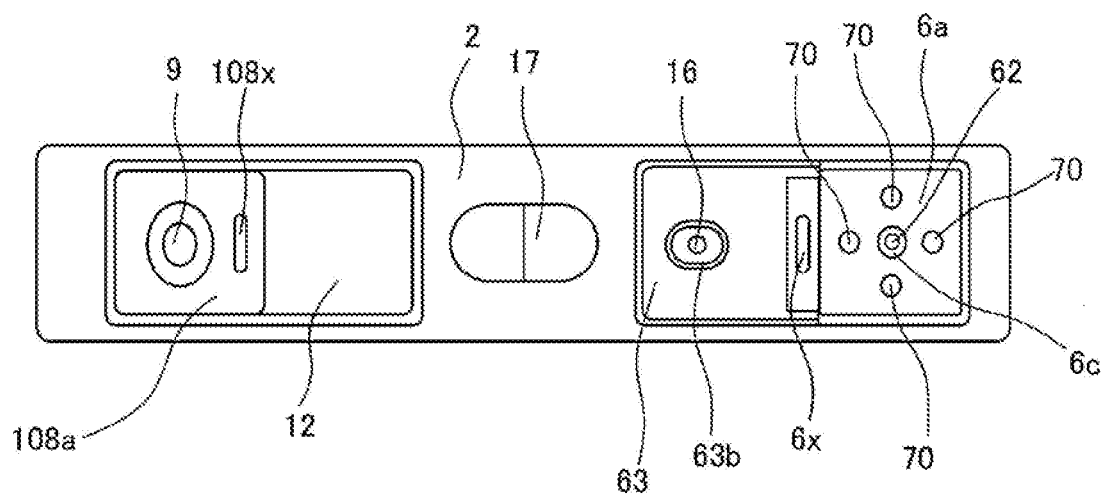
FIG. 13 is a bottom view of a sealing plate to which each component has been attached in a prismatic secondary battery according to Modification 1.
Figure 14:
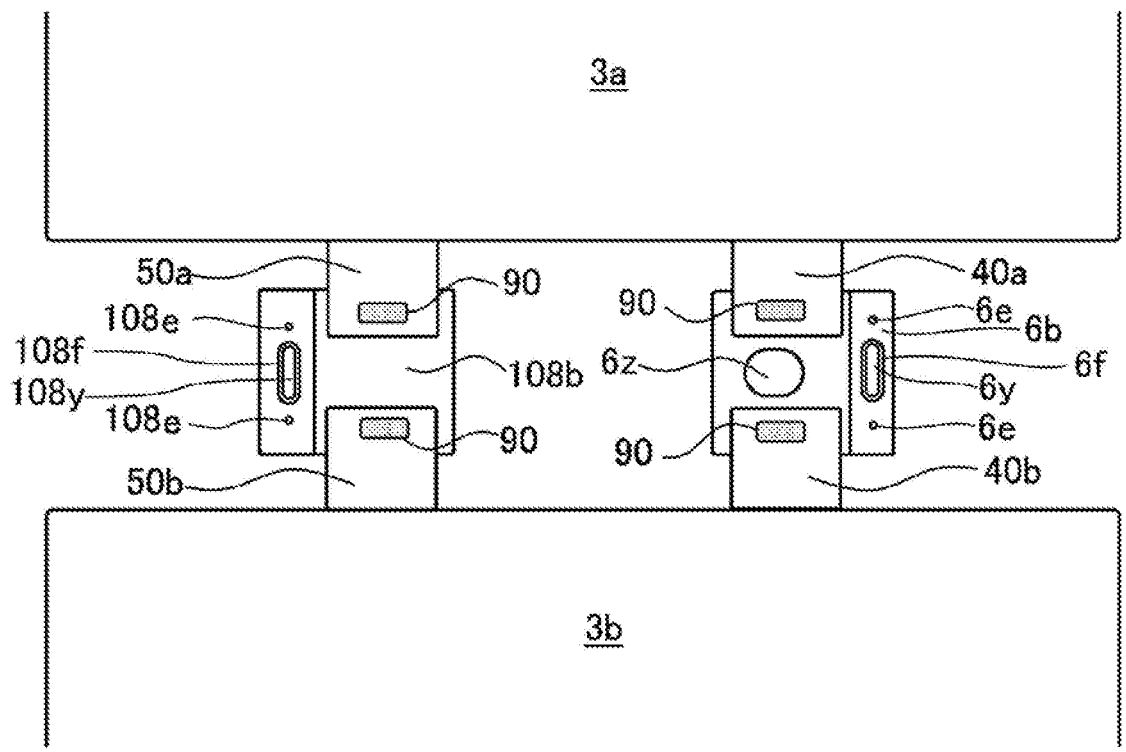
FIG. 14 is a view illustrating the process of connecting tabs to second current collectors in the prismatic secondary battery according to Modification 1.

FIG. 13 is a bottom view of a sealing plate to which each component has been attached in a prismatic secondary battery according to Modification 1. FIG. 14 is a view illustrating the process connecting tab to second current collectors in the prismatic secondary battery according to Modification 1. The prismatic secondary battery according to Modification 1 differs from the prismatic secondary battery 20 according to the embodiment in the shapes of the first negative electrode current collector and the second negative electrode current collector.

In the prismatic secondary battery according to Modification 1, a current collector protrusion 108x in a first negative electrode current collector 108a is formed such that the major axis of the current collector protrusion 108x extends in the transverse direction of the sealing plate 2. In the prismatic secondary battery according to Modification 1, a current collector opening 108y in a second negative electrode current collector 108b is formed such that the major axis of the current collector opening 108y extends the transverse direction of the sealing plate 2. This configuration can further reduce a space occupied by the current collecting part.

The second negative electrode current collector 108b has a current collector first recess 108f around the current collector opening 108y. Like the second negative electrode current collector 8b, the second negative electrode current collector 108b has target holes 108e. A current collector second recess 108w is formed in a surface of the first negative electrode current collector 108a that faces the internal insulating member 12 and that is located on the back side of the current collector protrusion 108x.

Modification 2

Figure 15:
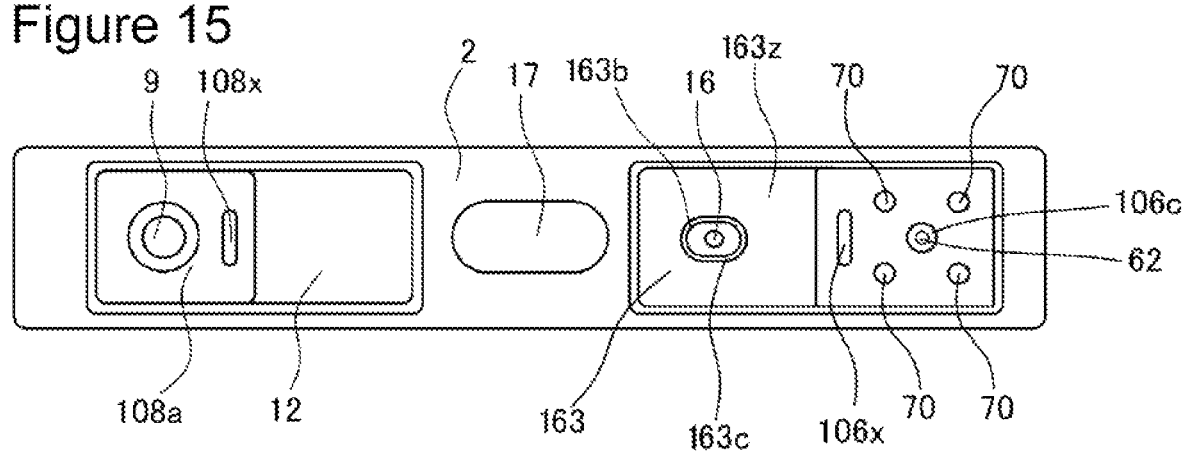
FIG. 15 is a bottom view of a sealing plate to which each component has been attached in a prismatic secondary battery according to Modification 2.
Figure 16:
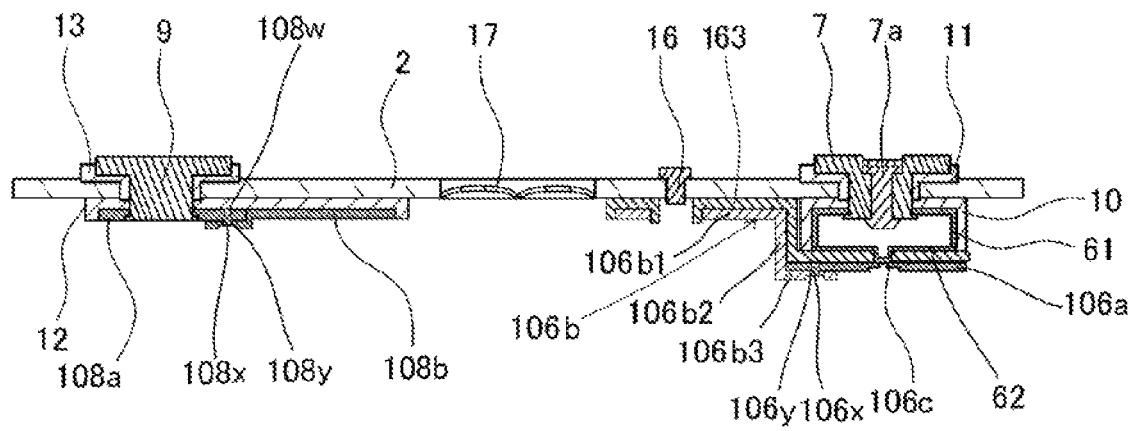
FIG. 16 is a sectional view in the longitudinal direction of the sealing plate to which each component has been attached in the prismatic secondary battery according to Modification 2.
Figure 17:
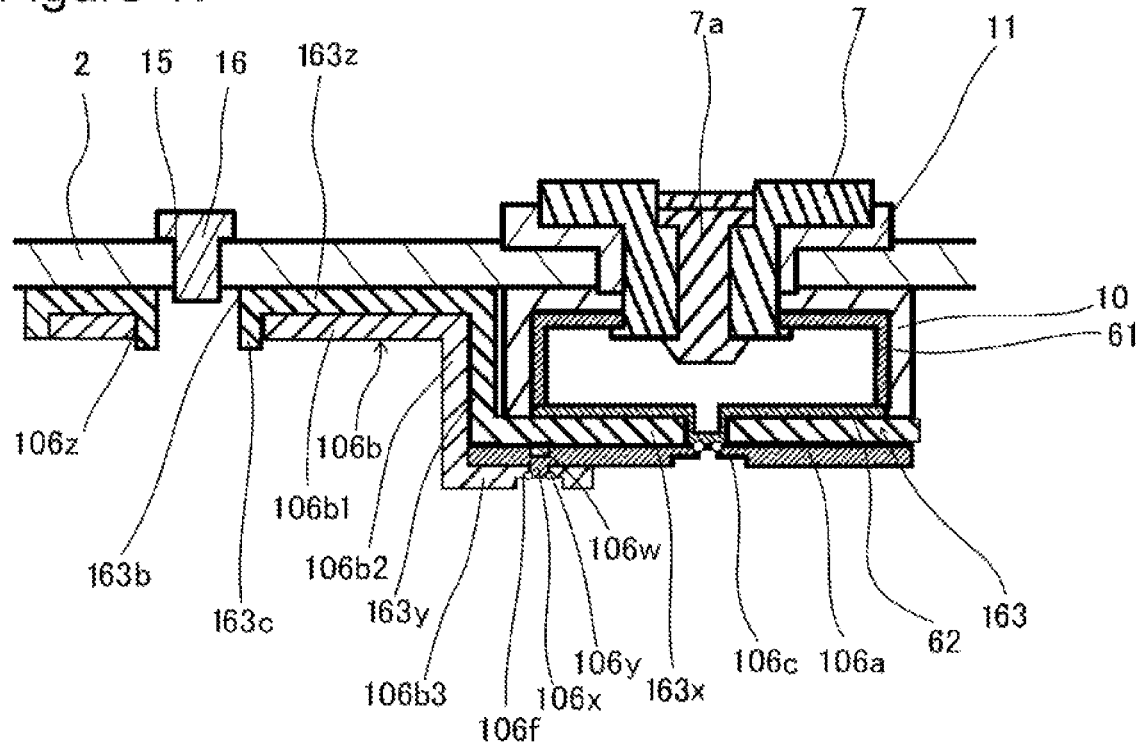
FIG. 17 is an enlarged view illustrating the first positive electrode current collector, the second positive electrode current collector, the current interrupting mechanism, and the surrounding area in FIG. 16.

FIG. 15 is a bottom view of a sealing plate to which each component has been attached in a prismatic secondary battery according to Modification 2. FIG. 16 is a sectional view in the longitudinal direction of the sealing plate to which each component has been attached. FIG. 17 is an enlarged view illustrating the first positive electrode current collector, the second positive electrode current collector, the current interrupting mechanism, and the surrounding area in FIG. 16. The prismatic secondary battery according to Modification 2 differs from the prismatic secondary battery according to Modification 1 in the shapes of the first positive electrode current collector, the second positive electrode current collector, and the first insulating member.

In Modification 2, a first positive electrode current collector 106a has a current collector protrusion 106x in a region under a deformation plate 62 (a region adjacent to electrode body 3). A second positive electrode current collector 106b has a tab connection region 106b1 to which positive electrode tabs are connected, a linkage region 106b2 extending downward (toward the electrode body 3) from an end of the tab connection region 106b1, and a current collector connection region 106b3 extending horizontally from an end of the linkage region 106b2. The current collector connection region 106b3 has a current collector opening 106y. The edge of the current collector opening 106y is weld-connected to the current collector protrusion 106x by means of laser welding or the like. This configuration can reduce a space occupied by the current collecting part.

The tab connection region 106b1 of the second positive electrode current collector 106b is disposed so as to face an insulating member third region 163z of a first insulating member 163. The linkage region 106b2 of the second positive electrode current collector 106b is disposed so as to face an insulating member second region 163y of the first insulating member 163. The first positive electrode current collector 106a is disposed so as to face an insulating member first region 163x.

Like the first positive electrode current collector 6a, the first positive electrode current collector 106a has a thin portion 106c. The thin portion 106c is weld-connected to the deformation plate 62. A current collector second recess 106w is formed in a surface of the first positive electrode current collector 106a that faces the first insulating member 163 and that is located on the back side of the current collector protrusion 106x.

The second positive electrode current collector 106b has a current collector first recess 106f around the current collector opening 106y. The second positive electrode current collector 106b has an opening 106z at a position facing an electrolyte injection port 15 in the sealing plate 2. The first insulating member 163 has an insulating member opening 163b at a position facing the electrolyte injection port 15 in the sealing plate 2. An insulating member protrusion 163c protruding downward is disposed at the edge of the insulating member opening 163b.

The prismatic secondary battery according to Modification 2 differs from the prismatic secondary battery 20 according to the embodiment in the positions of fixation parts 70 at which the first insulating member 163 is fixed to the first positive electrode current collector 106a. In the prismatic secondary battery according to Modification 2, as illustrated in FIG. 16, two fixation parts 70 re aligned with each other in the transverse direction of the sealing plate 2. The first insulating member 163 in the prismatic secondary battery according to Modification 2 differs from the first insulating member 63 in the prismatic secondary battery 20 according to the embodiment in the position at which the fixation protrusion is formed.

Others

The embodiment is an example where the electrode body 3 is composed of two electrode body elements 3a and 3b, but the configuration is not limited to this example. The electrode body 3 may be one stacked electrode body. The electrode body 3 may be one wound electrode body in which a long positive electrode plate and a long negative electrode plate are wound with a separator interposed therebetween. These two electrode body elements 3a and 3b are not necessarily stacked electrode bodies and may be wound electrode bodies in which a long positive electrode plate and a long negative electrode plate are wound with a separator interposed therebetween.

The connection between the first positive electrode current collector and the second positive electrode current collector and the connection between the first negative electrode current collector and the second negative electrode current collector are preferably performed by means of irradiation with an energy ray, such as a laser, an election beam, and an ion beam.

REFERENCE SIGNS LIST

20 Prismatic secondary battery
100 Battery case
1 Prismatic outer body
2 Sealing plate
2a Positive electrode terminal attachment hole
2b Negative electrode terminal attachment hole
3 Electrode body
3a, 3b Electrode body element 4 Positive electrode plate
4a Positive electrode core
4b Positive electrode active material mixture layer
4d Positive electrode protective layer
40, 40a, 40b Positive electrode tab
5 Negative electrode plate
5a Negative electrode core
5b Negative electrode active material mixture layer.
50, 50a, 50b Negative electrode tab
6a First positive electrode current collector
6a1 Current collector first region
6a2 Current collector second region
6a3 Current collector third region
6c Thin potion
6d Fixation through-hole
6w Current collector second recess
6x Current collector protrusion
6b Second positive electrode current collector
6b1 Tab connection region
6b2 Current collector connection region
6e Target hole
6f Current collector first recess
6y Current collector opening
6z Opening
6A Stepped part
7 Positive electrode external terminal
7a Terminal sealing member
　7x Metal plate
　7y Rubber member
7b Terminal through-hole
8a First negative electrode current collector
8w Current collector second recess
8x Current collector protrusion
8b Second negative electrode current collector
8b1 Tab connection region
8b2 Current collector connection region
8e Target hole
8f Current collector first recess
8y Current collector opening
8A Stepped part
9 Negative electrode external terminal
10 Internal insulating member
11 External insulating member
12 Internal insulating member
13 External insulating member
14 insulating sheet
15 Electrolyte injection port
16 Sealing plug
17 Gas release valve
60 Current interrupting mechanism
61 Conductive member
62 Deformation plate
63 First insulating member
63a Fixation protrusion
63b Insulating member opening
63c Insulating member protrusion
63x Insulating member first region
63y Insulating member second region
63z Insulating member third region
70 Fixation part
90 Weld-connected part
95 Welding jig
106a First positive electrode current collector
106c Thin portion
106w Current collector second recess
106x Current collector protrusion
106b Second positive electrode current collector
106b1 Tab connection region
106b2 Linkage region
106b3 Current collector connection region
106f Current collector first recess
106y Current collector opening
106z Opening
108a First negative electrode current collector
108w Current collector second recess
108x Current collector protrusion
108b Second negative electrode current collector
108y Current collector opening
108e Target hole
108f Current collector first recess
163 First insulating member
163b Insulating member opening
163c Insulating member protrusion
163x Insulating member first region
163y Insulating member second region
163z Insulating member third region

The invention claimed is:

1. A method for producing a secondary battery including:
an electrode body that includes a positive electrode plate and a negative electrode plate;
an outer body that has an opening and houses the electrode body;
a sealing plate that seals the opening;
an external terminal that is attached to the sealing plate and inserted into a through hole of the sealing plate;
a tab that is provided in the positive electrode plate or the negative electrode plate; and
a first current collector and a second current collector that electrically connect the tab to the external terminal and that are disposed nearer a lower face of the sealing plate than an upper face of the sealing plate,
wherein a connected portion of the first current collector with the external terminal is located nearer the lower face of the sealing plate than the upper face of the sealing plate,
the method comprising:
a fixation step of electrically connecting the first current collector to the external terminal and fixing the first current collector to the sealing plate;
a first connection step of weld-connecting a stack of a plurality of the tabs to the second current collector; and
a second connection step of connecting the first current collector to the second current collector after the fixation step and the first connection step.

2. The method for producing a secondary battery according to claim 1, wherein
the first connection step involves stacking 20 or more of the tabs on the second current collector and welding the tabs to the second current collector with the tabs and the second current collector sandwiched between welding jigs from two sides in a stacking direction of the tabs, and
the second connection step involves welding the first current collector to the second current collector by means of irradiation with an energy ray.

3. The method for producing a secondary battery according to claim 1, wherein the first connection step involves weld-connecting the tabs to the second current collector by means of ultrasonic welding or resistance welding.

4. The method for producing a secondary battery according to claim 1, wherein
the second current collector has a tab connection region substantially parallel to the sealing plate, and
the tabs are weld-connected to the tab connection region.

5. The method for producing a secondary battery according to claim 1, further comprising:
an electrode-body-element-production step of producing a first electrode body element including the positive electrode plate and the negative electrode plate and a second electrode body element including the positive electrode plate and the negative electrode plate,
wherein the first connection step involves placing the first electrode body element on one side of the second current collector, connecting the tabs of the first electrode body element to the second current collector, placing the second electrode body element on the other side of the second current collector, and connecting the tabs of the second electrode body element to the second current collector, and
wherein the method further includes, after the second connection step, a step of combining the first electrode body element and the second electrode body element together into the electrode body and inserting the electrode body into the outer body.

6. The method for producing a secondary battery according to claim 5, wherein, after the first electrode body element and the second electrode body element are combined together into the electrode body, and the electrode body is covered with an insulating sheet, the electrode body covered with the insulating sheet is inserted into the outer body.

7. The method for producing a secondary battery according to claim 1, wherein
the first current collector has a current collector protrusion,
the second current collector has a current collector opening, and
the second connection step involves inserting the current collector protrusion into the current collector opening and welding the current collector protrusion to an edge of the current collector opening.

8. The method for producing a secondary battery according to claim 7, wherein
an insulating member is disposed on a sealing plate side with respect to the first current collector, and
a current collector recess is formed in a surface of the first current collector, the surface facing the insulating member and being located on a back side of the current collector protrusion.

9. The method for producing a secondary battery according to claim 1, wherein
the fixation step involves fixing an insulating member to the sealing plate, and
the second connection step involves fixing the insulating member to the second current collector and then weld-connecting the first current collector to the second current collector.

10. The method for producing a secondary battery according to claim 1, wherein
the external terminal is a positive electrode external terminal,
the tab is a positive electrode tab provided in the positive electrode plate,
the first current collector is a first positive electrode current collector,
the second current collector is a second positive electrode current collector,
the secondary battery further includes:
a negative electrode external terminal that is attached to the sealing plate and inserted into a through hole of the sealing plate;
a negative electrode tab that is provided in the negative electrode plate; and
a first negative electrode current collector and a second negative electrode current collector that electrically connect the negative electrode tab to the negative electrode external terminal and that are disposed nearer the lower face of the sealing plate than the upper face of the sealing plate,
wherein a connected portion of the first negative electrode current collector with the negative electrode external terminal is located nearer the lower face of the sealing plate than the upper face of the sealing plate,
and
the method comprises:
a first step of electrically connecting the first negative electrode current collector to the negative electrode external terminal and fixing the first negative electrode current collector to the sealing plate;
a second step of weld-connecting a stack of a plurality of the negative electrode tabs to the second negative electrode current collector; and
a third step of connecting the first negative electrode current collector to the second negative electrode current collector after the first step and the second step.

11. The method for producing a secondary battery according to claim 10, wherein
the second step involves stacking 20 or more of the negative electrode tabs on the second negative electrode current collector and welding the negative electrode tabs to the second negative electrode current collector with the negative electrode tabs and the second negative electrode current collector sandwiched between welding jigs from two sides in a stacking direction of the negative electrode tabs, and
the third step involves weld-connecting the first negative electrode current collector to the second negative electrode current collector by means of irradiation with an energy ray.

12. The method for producing a secondary battery according to claim 1,
wherein a joined portion of the first current collector and the second current collector is located between the connected portion of the first current collector with the external terminal and a connected portion of the second current portion with the tab in a longitudinal direction of the sealing plate.

* * * * *